United States Patent [19]

Aronstam

[11] Patent Number: 5,886,255
[45] Date of Patent: Mar. 23, 1999

[54] METHOD AND APPARATUS FOR MONITORING MINERAL PRODUCTION

[75] Inventor: Peter Sheffield Aronstam, Houston, Tex.

[73] Assignee: Western Atlas International, Inc., Houston, Tex.

[21] Appl. No.: 949,748

[22] Filed: Oct. 14, 1997

[51] Int. Cl.$^6$ .............................. G01V 1/40; E21B 47/00; G01N 1/32

[52] U.S. Cl. ..................... 73/152.01; 73/594; 73/152.16; 73/152.58; 367/49; 367/27; 166/254.1; 364/422; 340/855.6

[58] Field of Search .......................... 73/152.01, 152.08, 73/152.59, 152.58, 152.16, 594, 628; 367/21, 25, 37, 40, 49, 57, 73; 340/855.5, 855.6; 166/249, 250.1, 254.1

[56] References Cited

U.S. PATENT DOCUMENTS

| | | | |
|---|---|---|---|
| 4,365,322 | 12/1982 | Widrow | 367/32 |
| 4,517,836 | 5/1985 | Lyle, Jr. et al. | 73/152 |
| 4,646,565 | 3/1987 | Siegfried | 73/152 |
| 4,648,039 | 3/1987 | Devaney et al. | 364/421 |
| 4,740,928 | 4/1988 | Gutowski et al. | 367/27 |
| 4,922,362 | 5/1990 | Miller et al. | 367/46 |
| 4,986,350 | 1/1991 | Czernichow | 166/65.1 |
| 5,042,611 | 8/1991 | Howlett | 181/104 |
| 5,081,611 | 1/1992 | Hornby | 367/25 |
| 5,109,947 | 5/1992 | Rector, III | 181/106 |
| 5,144,590 | 9/1992 | Chon | 367/57 |
| 5,363,094 | 11/1994 | Staron et al. | 340/854.6 |
| 5,377,105 | 12/1994 | Smith | 364/422 |
| 5,461,594 | 10/1995 | Mougenot et al. | 367/48 |
| 5,597,042 | 1/1997 | Tubel et al. | 166/250.01 |
| 5,662,165 | 9/1997 | Tubel | 166/250.1 |

OTHER PUBLICATIONS

Fracture Detection Using Crosswell and Single Well Surveys; Ernest J. Majer, John E. Peterson, Thomas Daley, Bruno Kaelin, Larry Myer, John Queen, Peter D'Onfro, and William Rizer; Geophysics, vol. 62, No. 2 (Mar.–Apr., 1997), pp. 495–504, 8 Figs.

Pore Fluids and Frequency–Dependent Wave Propagation in Rocks; Terry D. Jones; Geophysics, vol. 51, No. 10 (Oct., 1986), pp. 1939–1953, 18 Figs., 2 Tables.

Primary Examiner—Hezron Williams
Assistant Examiner—J. David Wiggins
Attorney, Agent, or Firm—William A. Knox

[57] ABSTRACT

Long-term changes in the distribution of a mineral in a subsurface deposit, due to commercial production of the mineral, are monitored by suitable instrumentation. The monitoring instrumentation is installed in combination with commercial mineral production equipment but the monitoring instrumentation is transparent to production. The monitoring instrumentation measures long-term changes in selected petrophysical attributes that are due to re-distribution of the mineral within the deposit in response to production.

13 Claims, 5 Drawing Sheets

METHOD AND APPARATUS FOR MONITORING MINERAL PRODUCTION

BACKGROUND OF THE INVENTION

1. Field of the Invention

A selected geophysical analogue of a petrophysical parameter is measured over the lifetime of a mineral deposit. Quantitative time-dependent changes in the selected geophysical analogue are indicative of changes in the re-distribution of the mineral within the deposit by reason of mineral production management.

2. Discussion of Related Art

Geophysical surveys are used to discover the extent of subsurface mineral deposits such as oil, natural gas, water, sulphur, etc. Geophysical methods may also be used to monitor changes in the deposit, such as depletion resulting from production of the mineral over the natural lifetime of the deposit which may be many years. The usefulness of a geophysical study depends on the ability to quantitatively measure and evaluate some geophysical analogue of a petrophysical parameter that is directly related to the presence of the mineral under consideration.

Potential-field measurements such as electrical resistivity of the rocks penetrated by a borehole may be indicative of the rock conductivity. Radioactive and gravity fields may be of interest.

Seismic methods may be applied to production-management monitoring. As is well known to geophysicists, a sound source at or near the surface of the earth is caused periodically to inject an acoustic wavefield into the earth at each of a plurality of regularly-spaced survey stations. The wavefield radiates in all directions to insonify the subsurface earth formations whence it is reflected back to be received by seismic sensors (receivers) located at designated stations also located at or near the surface of the earth. The seismic sensors convert the mechanical earth motions, due to the reflected wavefield, to electrical signals. The resulting electrical signals are transmitted over a signal-transmission link of any desired type, to instrumentation, usually digital, where the seismic data signals are archivally stored for later processing.

The travel-time lapse between the emission of a wavefield by a source and the reception of the resulting sequence of reflected wavefields by a receiver, is a measure of the depths of the respective earth formations from which the wavefield was reflected. The relative amplitudes of the reflected wavefields may be a function (an analogue) of the density and fluid content of the respective earth formations from which the wavefields were reflected. The frequency content of the returned signals may be influenced by the type of fluid content of the sought-for mineral.

In a commonly-used 3-D seismic survey, the seismic observation stations are preferably distributed in a regular grid over an area of interest with inter-station spacings on the order of 25 meters. The processed seismic data associated with a single receiver are customarily presented as a one-dimensional time scale recording displaying rock layer reflection amplitudes as a function of two-way wavefield travel time. A plurality of seismic traces from a plurality of receivers sequentially distributed along a line of survey may be formatted side-by-side to form an analog model of a cross section of the earth in the form of two-dimensional imaging. Seismic sections from a plurality of intersecting lines of survey distributed over an area of interest, provide three-dimensional imaging.

In the case of an oil field, by way of example but not by way of limitation, a series of 3-D surveys over the area embraced by the oil field could be surveyed at regular time intervals such as every day or every six months during the lifetime of the oil deposit. Thus, one could monitor the depletion rate of the fluid content of the field. That sort of study would comprise a 4-D, time-lapse study of the metamorphosis of the mineral deposit over time.

Wavefield reflection from a subsurface interface depends on the acoustic characteristics of the rock layers that define that interface such as density and wavefield propagation velocity. In turn those characteristics depend inter alia on the rock type, rock permeability and porosity, fluid content and fluid composition. In a subsurface reservoir, the fluid phase-change from gas to oil or oil to water, may act as a weak reflecting surface to generate the so-called bright spots sometimes seen on seismic cross sections. It is reasonable to expect that a change in the level or the characteristics of the reservoir fluids will create a change in the seismic signature associated with the reservoir. The amplitude level of the seismic signature of a reflection associated with a fluid interface is an analogue of a petrophysical attribute, namely the fluid content of the rock layer. Thus, time-lapse or 4-D tomography, that is, the act of monitoring the regional seismic signature of a reservoir over a long period of time would allow monitoring the depletion of the reservoir or the mapping advance of thermal front in a steam-flooding operation.

The term "signature" used herein means the variations in amplitude and phase of an acoustic wavelet (for example, a Ricker wavelet) expressed in the time domain as displayed on a time scale recording. The impulse response means the response of the instrumentation to a spike-like Dirac function.

Successful time-lapse monitoring requires that differences among the processed 3-D data sets must be attributable solely to physical changes in the petrophysical characteristics of the reservoir. That criterion is severe because changes in the data-acquisition equipment and changes in the processing algorithms, inevitable over many years, introduce differences among the separate surveys. Long-term environmental changes in field conditions such as weather and culture affect the outcome. If time-lapse tomography is to be useful for quantitative reservoir monitoring, instrumental and environmental influences that are not due to changes in reservoir characteristics must be transparent to the before-and-after seismic data sets. Successful time-lapse tomography requires careful preliminary planning.

One way to avoid selected time-dependent environmental changes and updated state-of-the-art instrumental changes is to permanently emplace seismic detectors in one or more boreholes in and around the mineral deposit and to use identical processing methods throughout the monitoring period.

U.S. Pat. No. 5,461,594 issued Oct. 24, 1995 to Denis Mougenot et al. for a METHOD OF ACQUIRING AND PROCESSING SEISMIC DATA RECORDED ON RECEIVERS DISPOSED VERTICALLY IN THE EARTH TO MONITOR THE DISPLACEMENT OF FLUIDS IN A RESERVOIR, according to the Abstract, teaches a method of acquiring and processing seismic data for the repetitive monitoring of displacement of fluids impregnating a reservoir deep in the subsurface below the surface weathering zone comprises the steps of making at each point on a predetermined grid on the surface a vertical axis shallow borehole in the earth above the reservoir passing through the weathered layer, positioning in each borehole along its vertical axis a plurality of fixed receivers adapted to be connected separately to the seismic recorder on the surface, emitting near each borehole seismic waves into the earth by means of an emitter on the surface or close by the surface near the vertical axis of the borehole, recording for each borehole by means of receivers placed in the borehole to receive direct incident seismic waves and the seismic waves reflected at the interfaces of the deep strata of the subsurface, each receiver providing a separate record of an incident wave and a plurality of reflected waves, and carrying out the following process steps for each borehole: picking the first break of direct incident waves, horizontalizing the reflected waves, separating the reflected waves and the direct incident waves, deconvolving receiver by receiver the reflected waves by the direct incident wave in order to obtain a zero-phase trace for each receiver and stacking the zero-phase traces from the receivers to obtain a low coverage/zero-offset, zero-phase trace. This patent was concerned with a land system but its teachings could be extended to a marine system by installing the sensors in boreholes or crypts on the sea floor.

The inventors of the '594 patent recognize the need for maintaining identical instrumentation and processing methods throughout the reservoir-monitoring epoch. Therefore, sensors are permanently sealed in a plurality of boreholes distributed over the area of interest. A standard source and standard processing methods are used to maintain constant data-gathering/interpretation conditions throughout the monitoring epoch. But to monitor properly a reservoir of large areal extent, many hundreds or thousands of densely-distributed borehole-emplaced sensors would be needed, a very uneconomical installation indeed, which renders that method to not be very practical. Furthermore, use of surface sources necessarily invokes the unwanted filtering effects of near-surface earth layers as well as changing environmental effects over time.

D. L. Howlett, in U.S. Pat. No. 5,042,611 for a METHOD AND APPARATUS FOR CROSS-WELL SEISMIC SURVEYING teaches a method for,inter-well seismic logging that includes a seismic source that is lowered into a source borehole and a plurality of seismic receivers lowered into at least another borehole. Signals generated from the seismic source pass through the earth and are received by the respective receivers after transmission through a geological anomaly of interest. The seismic data are recorded and processed to form a profile that represents the geological configuration between the wells. Instrumentation emplaced in several boreholes in various combinations are suggested so that the geological anomaly may be examined along several different wavefield trajectories.

Although Howlett teaches cross-well tomography, he does not suggest that technique for use with permanently-emplaced instrumentation in a borehole over the long term in the context of 4-D tomography.

In a paper published in *Geophysics*, v. 62, n. 2 (March–April 1997) pp. 495–504 entitled FRACTURE DETECTION USING CROSSWELL AND SINGLE WELL SURVEYS, E. L. Majer et al. employ cross-well seismic data for time-lapse imaging of a gas filled vertical fracture zone in the Riley limestone in an Oklahoma borehole test facility.

A United Kingdom patent application GB2302113A, entitled Production Wells Having Permanent Downhole Formation Evaluation Sensors, filed in the name of P. Tubel et al. discloses a permanent downhole sensor installation. Here, sensors are permanently emplaced downhole, in combination with the production string, in oil, gas or injection wells for collecting real time data. The data are used for, among other purposes, (a) defining the reservoir, (b) defining the distribution of oil, water or gas in a reservoir with respect to time and (c) monitoring the saturation, depletion and movement of oil, water and gas in real time. The teachings of this reference are confined to studies of the environs immediately surrounding the well in which the instrumentation is installed. Information regarding fluid distribution between wells, in a multi-well oil patch, is not contemplated.

There is a need for a method for monitoring the time-varying changes of one or more selected petrophysical attributes that result from the time-lapse metamorphosis of a mineral deposit due to long-term resource management and mineral production therefrom.

SUMMARY OF THE INVENTION

In combination with mineral production management during the productive life-span of a subsurface deposit containing at least one mineral, a method is proposed for cyclically monitoring time-varying changes of a selected geophysical analogue of a petrophysical parameter attributable to volumetric re-distribution of the contents of the mineral deposit. The changes are due to production of the mineral content thereof from a plurality of spaced-apart boreholes associated with the deposit. One or more sources for radiating a wavefield are installed in each of the plurality of boreholes. The radiated wavefield illuminates the subsurface region embracing the mineral deposit. One or more sensors are installed in each of the boreholes for imaging the selected petrophysical parameter in the light of the radiation. In combination with the process of mineral production management, during each of a plurality of monitoring cycles, each source in turn radiates a wavefield from its location in the respective boreholes to illuminate the subsurface region. In at least a second one of the boreholes during each monitoring cycle, the one or more sensors provide one or more single-ray measurements of the selected petrophysical parameter. The one or more single-ray measurements can be combined to construct a snap-shot image of the selected petrophysical parameter taken in the light of the wavefield radiation that illuminates the subsurface region between the one or more sources and the one or more sensors. The subsurface region is illuminated from different angles by repeating the above steps between every pair of boreholes or source-receiver pairs, taken in all possible combinations of wavefield trajectories to furnish a plurality of single-ray imaging measurements. The plurality of single-ray imaging measurements are combined to provide a timely snap-shot image of the subsurface deposit following each monitoring cycle.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

As explained earlier, commercial management and exploitation of a subsurface mineral deposit may result in a change in one or more geophysical analogues of a selected petrophysical parameter associated with the re-distribution of the sought-for mineral in that deposit. Long-term monitoring over the lifetime of the deposit requires a stable environmental and instrumental presence throughout the study period. The selected geophysical analogues may result from direct transmission through, reflection from, or refraction into a target geological horizon.

It is proposed that the required instrumentation be permanently installed in boreholes or shafts normally associated with mineral exploitation. Although special boreholes or shafts could be provided as necessary to provide adequate subsurface illumination, use of existing production holes is preferred. Preferably, the same boreholes or shafts are used for instrumentation as are also used for normal production or re-distribution of the mineral of interest. Non-interference with routine commercial operations is assumed. The required instrumentation may be integrated with the production tubing as will be shown later. Non-permanent instrumentation may be lowered into the borehole by wireline in a well-known manner. By way of example but not by way of limitation, this invention will be disclosed in relation to oil and gas production and production stimulation but recovery of other minerals is not excluded.

Figure 1:
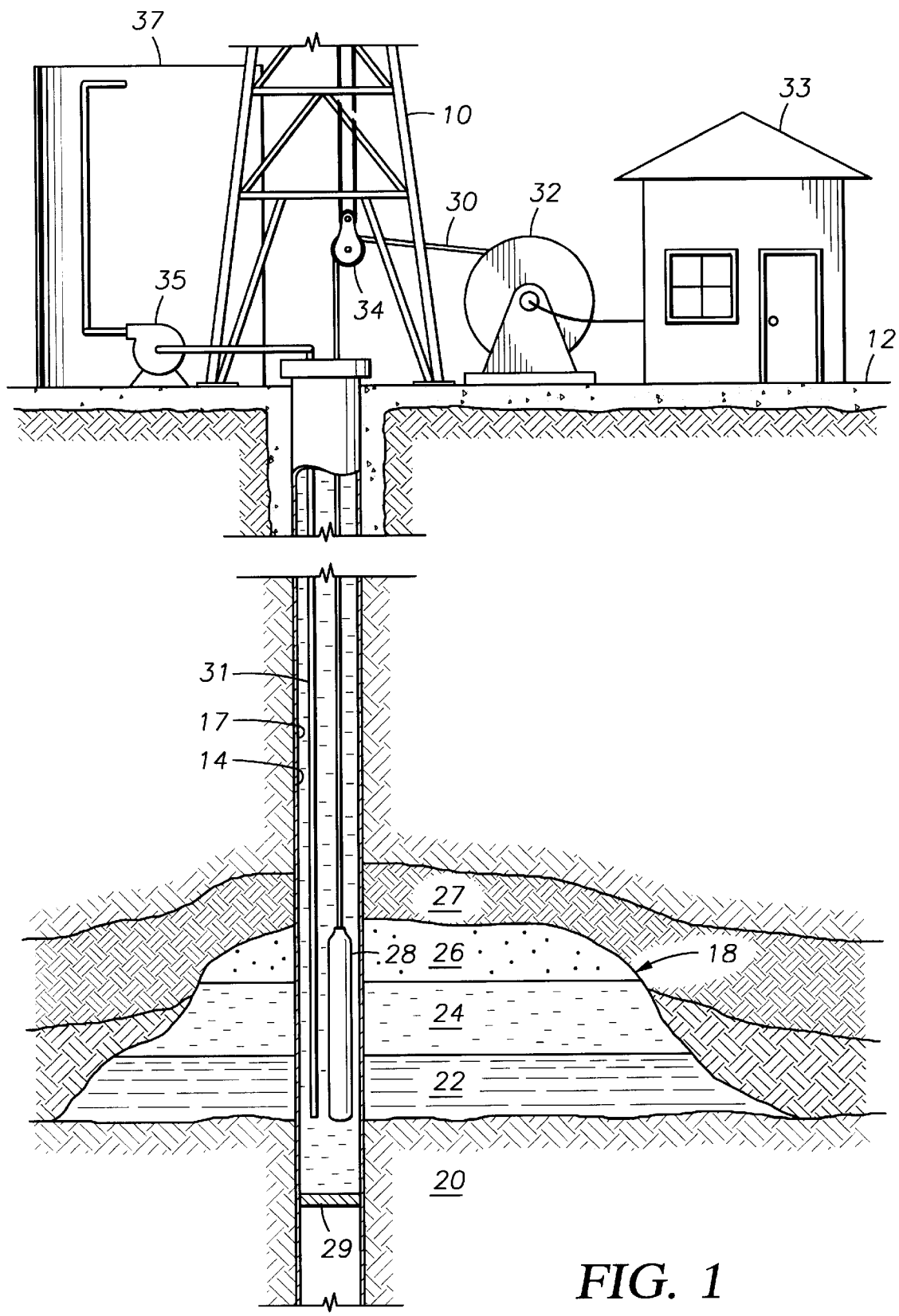
FIG. 1 is an oversimplified illustration of a mineral deposit that happens to contain hydrocarbons.

FIG. 1 is a schematic cross section of the earth showing an oil rig 10 mounted at the surface 12 over a borehole 14 that penetrates the earth 16. A subsurface mineral deposit such as a dolomite reef 18 has built up over a stratum 20. Reef 18 includes a layer of salt water 22, a layer of oil 24 and a gas cap 26. Dolomite reef 18 is shown sealed by a cap-rock stratum 27 that prevents escape of the gas from gas cap 26. Borehole 14 is provided with a casing 17 that is perforated in the oil-bearing zone 24 but is sealed off below by a packer 29.

A logging tool 28 of any desired type may be lowered into borehole 14 from wireline 30 that is fed from draw-works 32 over sheave 34 suspended from derrick 10. Wireline transmits command and power signals down to the tool 28 from surface control and data-storage electronics (not shown) that are housed in a data-processing center 33. Tool 28 sends data signals from the down-hole sensors back to the electronics package in data-processing center 33 for archival storage and later processing.

Production tubing, symbolically shown as 31, is coupled to pump 35 which pumps or otherwise moves fluid product from a reservoir rock such as 24 in borehole 14 to tankage such as 37.

Logging tool 28 may include dynamic wavefield-generating devices such as acoustic transducers and sensors or transducers of other genera including potential field devices such as gravity sensors, electromagnetic wavefield transducers, gamma-ray sensors, neutron sources and the like, all depending upon the characteristics of the particular mineral to be harvested. The configuration and disposition of an exemplary logging tool will be explained later with respect to FIG. 5. For long-term reservoir monitoring, the logging tool 28, once inserted, would be permanently fixed in place but in communication with surface control and data storage electronics 33.

Figure 2:
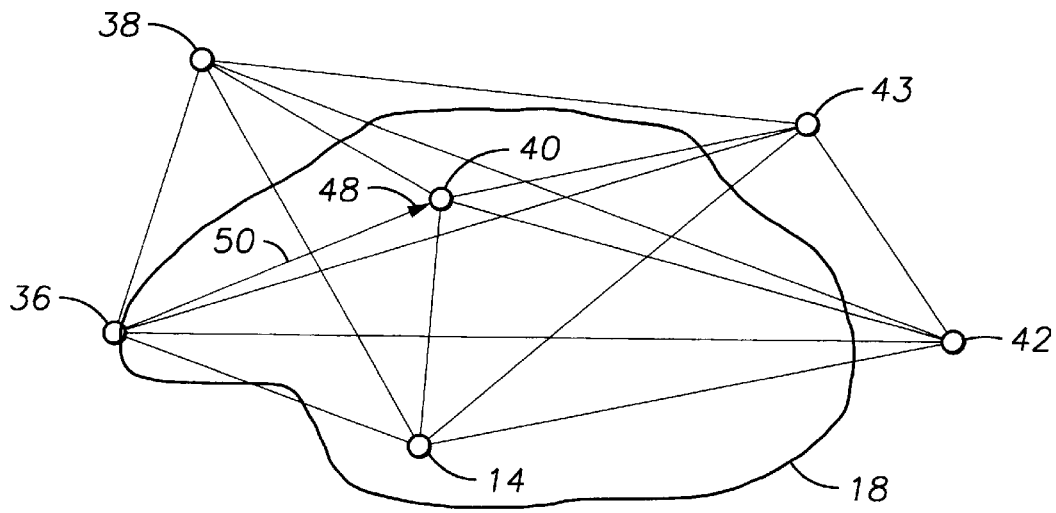
FIG. 2 is a plan view of four boreholes associated with a mineral deposit.

FIG. 2 is a plan view of a mineral deposit such as the oil reservoir 18 of FIG. 1, in association with which, six boreholes or wells 36, 38, 14, 40, 42, 43 have been drilled, three of which, 14 and 36 and 40, penetrate the reef 18. The six wells, form a pattern of spaced-apart boreholes in a geologic region that embraces mineral deposit 18, some of which boreholes penetrate the deposit. In the Figures, six boreholes are shown for simplicity but in a commercial, producing oil field, many tens or even hundreds of boreholes may be available for monitoring and study.

Figure 3:
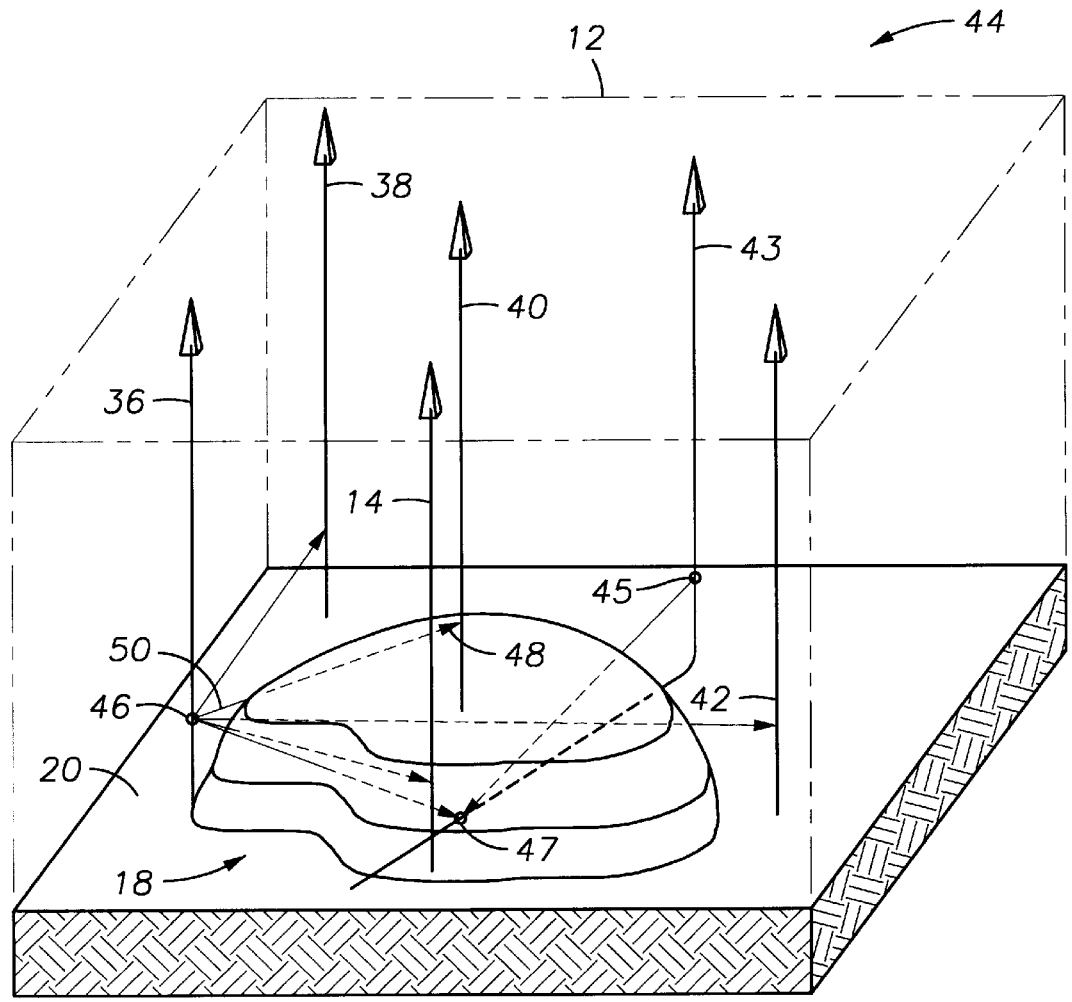
FIG. 3 is a schematic cross-sectional diagram of the earth layers beneath the region of FIG. 2.

FIG. 3 is a pseudo-perspective view of a volume 44 of the earth containing dolomite reef 18 corresponding to the plan view of FIG. 2, showing the six wells 36, 38, 14, 40, 42 and 43. The well shafts are dashed where they penetrate the mineral deposit 18. Well 43 is deviated at depth such that the well bore is substantially horizontal where it enters the production zone. The rest of the wells are substantially vertical. For clarity in the drawings, formations above base layer 20 and deposit 18 are conceptually transparent.

Each of the wells includes instrumentation designed to monitor some selected geophysical property of the rock layers in and around reservoir 18. For purposes of illustration, the use of acoustic (seismic) transducers will be assumed for FIG. 3. As is well known, a generic acoustic transducer may serve either as an acoustic transmitter (a source) or an acoustic receiver (sensor). Therefore, given a downhole array of seismic transducers, by suitable control-signal programming, any one transducer may act as either a source or a sensor, thus providing the user with considerable operational flexibility. In the Figure, each well contains an array of a plurality of spaced-apart transducers, any one of which may be programmed to serve as source or sensor.

As was earlier pointed out, acoustic studies include measurement of certain geophysical attributes that depend upon petrophysical parameters of the rock layers through which the acoustic wavefields propagate or from which the acoustic wavefield is reflected.

Referring again to FIG. 3 a small circle, 46 at well 36 represents, by way of example but not by way of limitation, an acoustic source. Source 46 radiates a wavefield that propagates along cross-well trajectory 50 to a seismic receiver transducer as represented by arrow head 48 at well 40. Cross-well trajectory 50 is dashed where it passes through reef 18. The wavefield similarly propagates to seismic receivers (shown as arrows) at the other wells such as 14, 38, 42, 43 in a horizontal fanout, as shown in FIG. 2, to furnish a plurality of single-ray measurements of the selected geophysical attribute by illuminating the subsurface that is associated with mineral deposit 18. The plurality of trajectories of FIG. 2 are not shown in FIG. 3 to avoid complicating the drawing.

Not only are inter-well trajectories possible, trajectories between a source and receiver(s) in the same borehole may be used. For example, a source 45 in deviated borehole 43 illuminates sensor 47. Likewise, source 46 in borehole 36 also illuminates receiver 47.

In summary and with reference to FIGS. 2 and 3, a source such as 46 radiates a wavefield to illuminate the mineral deposit 18 in the glow of the radiated acoustic wavefield. A receiver such as 48 receives a single-ray imaging measurement of a selected geophysical analogue of a petrophysical parameter that emanated from the illuminated portion of deposit 18 that interrupts the wavefield trajectory 50 between the source and the receiver. As shown in the plan view of FIG. 2, wavefields radiate along trajectories extending across the gap between any source and any receiver in all combinations so as to illuminate the mineral deposit from all angles in every available direction. The single-ray measurements of the selected geophysical quantity as measured between the respective sources and receivers taken in all possible combinations, are processed and combined to display a snap-shot image of the sub-crop 18 to reveal its petrophysical texture in the light of the acoustic wavefield radiation.

It is contemplated that one or more substantially horizontal slices of the deposit would be imaged at one or more desired vertical intervals, showing the re-distribution of the hydrocarbon fluids within the different depth levels in the dolomite reef 18. To that end and for each subsurface level to be monitored, a set of source and receiver transducers would be installed at substantially the same sub-sea depth in each of the respective wells or boreholes of interest. Given a sufficient vertical aperture, this method would also provide a complete volumetric model in three dimensions (3-D imaging).

Figure 4:
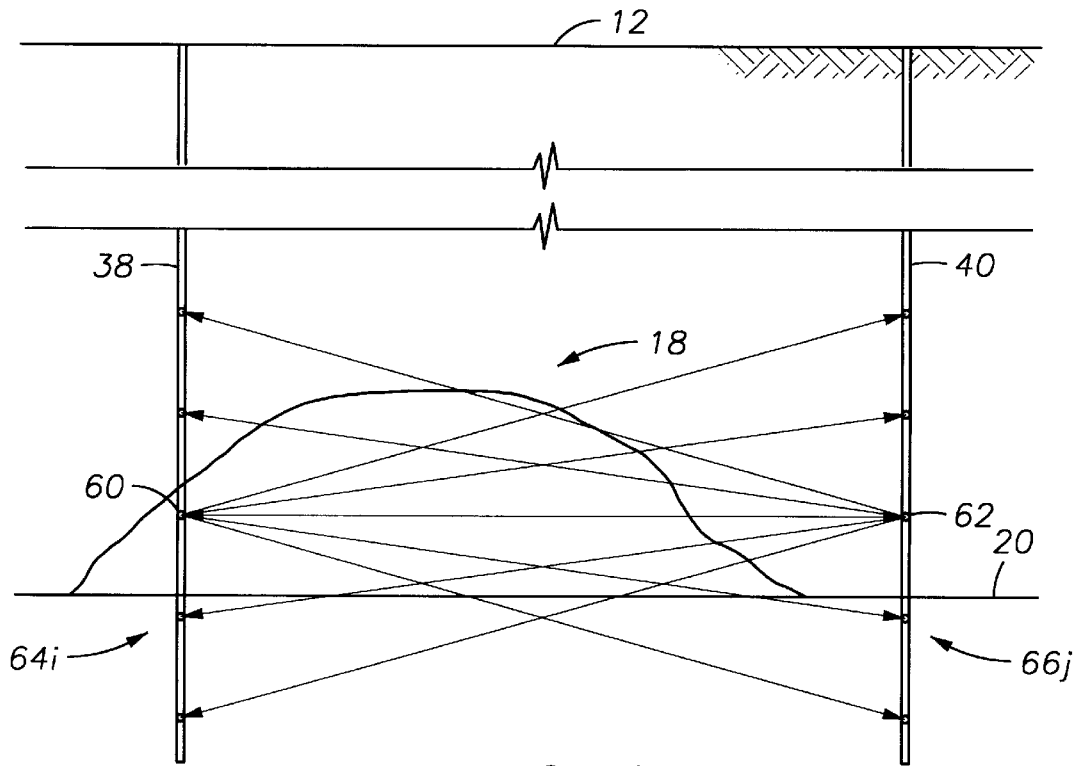
FIG. 4 illustrates the use of several vertically spaced-apart receivers is combination with a single source transducer.

In the initial installation, the optimum depth level(s) to be monitored may not be known precisely. A vertical trajectory fanout arrangement as shown in FIG. 4 between wells 38 and 40 provides a shotgun approach to solve that problem by providing a plurality of vertically spaced-apart receivers in each of the wells. In FIG. 4, as before, source transducers are represented by small circles 60 and 62 in the respective wells and receiver transducers are represented by flying arrows generally referenced as $64_i$ and $66_j$, (i, j,=1, . . . , n). Observe that source 60 is co-located with receiver $64_3$ and source 62 is co-located with receiver $66_3$. The other wells may be instrumented in a similar manner. Dolomite reef 18 is thus illuminated from many angles by the horizontal and vertical wavefield-radiation trajectory fanouts.

Figure 5:
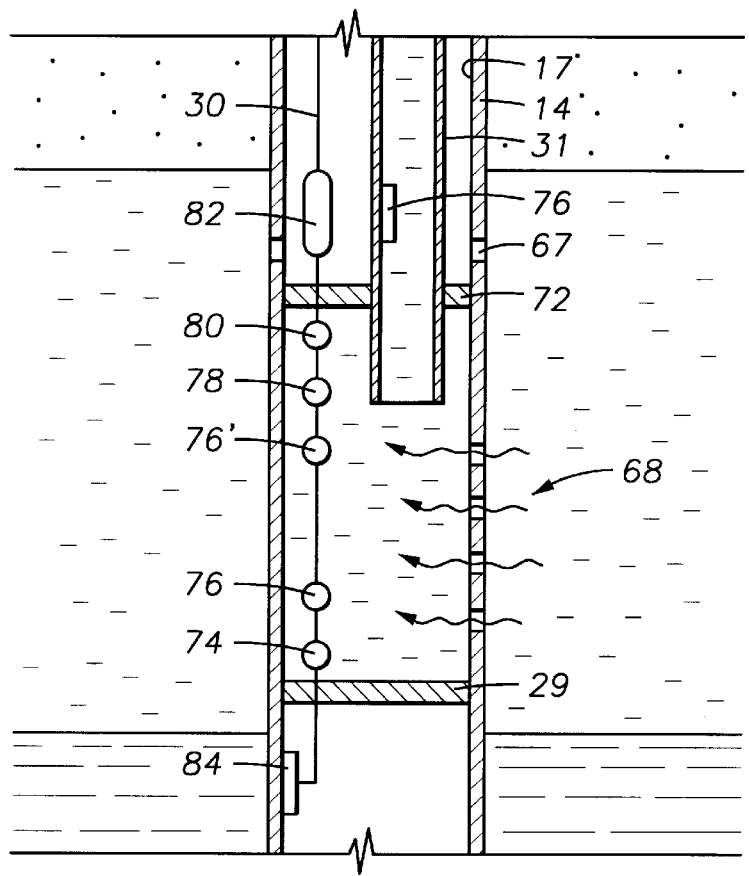
FIG. 5 is a schematic view of one form of monitoring instrumentation arranged for permanent installation in a borehole in combination with conventional production tubing.

FIG. 5 illustrates in somewhat greater detail, one possible arrangement for the downhole instrumentation for introduction to the exemplary oil well 14 in combination with the production string. As before stated, a casing 17 may inserted into the borehole 14 in conformance to standard industry practice. Casing 17 is perforated in the production zone to allow fluid-flow from the reservoir rock into the casing as generally shown by the wiggly arrows 68. Above the production zone, casing 17 is sealed in place by an annular cement plug.67 or the like. Production tubing 31 is inserted into casing 17. Unwanted fluid-flow up the annulus between casing 17 and the sidewall of borehole 14 is blocked by packers 72 and 29 above and below the productive zone. Oil accumulating in casing 17 flows or is pumped up through production tubing 31 for recovery at the surface by means well-known to the industry as described in connection with FIG. 1. The oil flow rate inside the production tubing 31 may be monitored by a known dual-phase flowmeter 76, having an inductive output.

Alongside production tubing 31, the instrumentation to be used for monitoring the petrophysical characteristics of reservoir 18, mounted on a suitable logging tool, is lowered into the well from wireline 30 as in FIG. 1. Preferably, however, the instrumentation may form an integral part of the production tubing. For use in a horizontal borehole, the instrumentation is mounted on coiled tubing that is normally used in such circumstances. It is to be considered that the installation is permanent over the life of the mineral deposit.

The choice of the specific sensors to be used, depends, of course, upon the geology of the target mineral deposit. For acoustic studies, a source transducer such as 74 and one or more receiver transducers such as 76, 76' are installed on the tool. The output of the source transducer is a low level signal to prevent damage to the production equipment. Therefore, for any given monitoring cycle, the source installed in one well is caused to repeatedly illuminate the reservoir by emitting a series of discrete acoustic pulses over a long time period such as a day or more. Each discrete acoustic wavefield thus emitted are imaged by the sensor(s) provide a single-ray imaging measurement of a petrophysical parameter.

The single-ray imaging measurements are converted to electrical signal that are transmitted to surface processing instrumentation which may be housed in a local processing center 33 or in a remotely located processing laboratory. A plurality of single-ray imaging measurements are combined, as by stacking, and processed to form a composite snap-shot representation of the pre-selected petrophysical parameter as revealed by the wavefield illumination. Preferably, signal processing is performed using any well-known computer-aided data-processing program.

One example of a suitable diagnostic technique, assuming emanation of discrete, spike-like acoustic pulses by the sources, contemplates measuring the relaxation time of the caudal portion of a Dirac function as received after passage through a zone of interest.

In place of discrete pulses, a source transducer from one of the wells may emit an acoustic or electromagnetic swept-frequency or chirp signal at selected time intervals. The emitted chirp signal is characterized by a frequency continuum within a selected frequency pass band. The chirp signal as received at another of the wells will exhibit a frequency absorption spectrum with absorption bands determined by the nature of the fluid(s) resident in a reservoir rock through which the transmitted chirp signal travelled between the wells. The spectral content of the received signal may be displayed by use of well-known power-spectral analyses. That concept was described by T. D. Jones in *Geophysics*, v. 51, n. 10, pp. 1939–1953 (October 1986), in a paper entitled Pore Fluids and Frequency-Dependent Wave Propagation in Rocks.

Other sensors that beneficially may be installed for long-term monitoring of the re-distribution of the mineral content of a deposit are a nuclear detector 78 and a gravity meter 80. Such tools would be useful in the more exotic environments as well as in oil production. Other suitable instruments may passively record time-variant changes in self potential or side-wall conductivity.

Resistivity measurements are important measures of the type and saturation of the reservoir rock. Reference number 84 indicates a E/M resistivity tool. That type of tool requires that the electrodes be pressed against the borehole sidewall to make the required measurements. To that end, E/M tool 84 is shown dangling below the bottom of casing 17. In practice, it would be preferable that one or more holes be cut into casing 17 so that the tool can be positioned opposite the productive zone in the reservoir rock.

The output from flowmeter 76 or other conventional production measurements would be received by inductive pickup 82 for transmission to the surface recording equipment.

Figure 6:
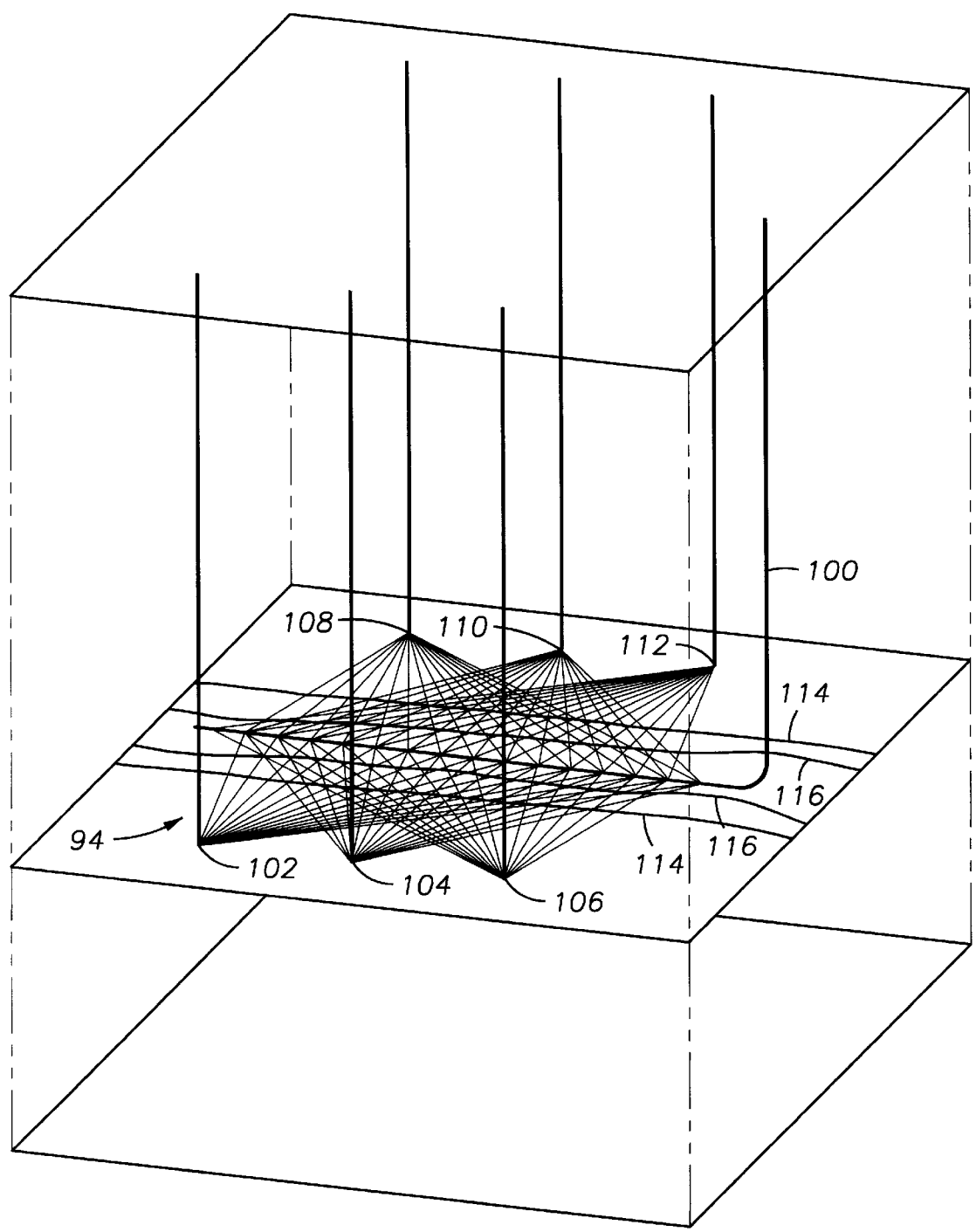
FIG. 6 is a quasi-perspective view of an oil field undergoing water-flood stimulation, showing a deviated production well and six injector wells.

FIG. 6 is a synthetic quasi-perspective view of an oil deposit, generally shown as 94, whose productive life is being extended by the well-known water flooding method from injector wells. It is desired to monitor the progress of the water-flood front over time by time-lapse observation of an acoustic parameter such as acoustic slowness. Acoustic attenuation could also be monitored in place of acoustic slowness.

Figure 7:
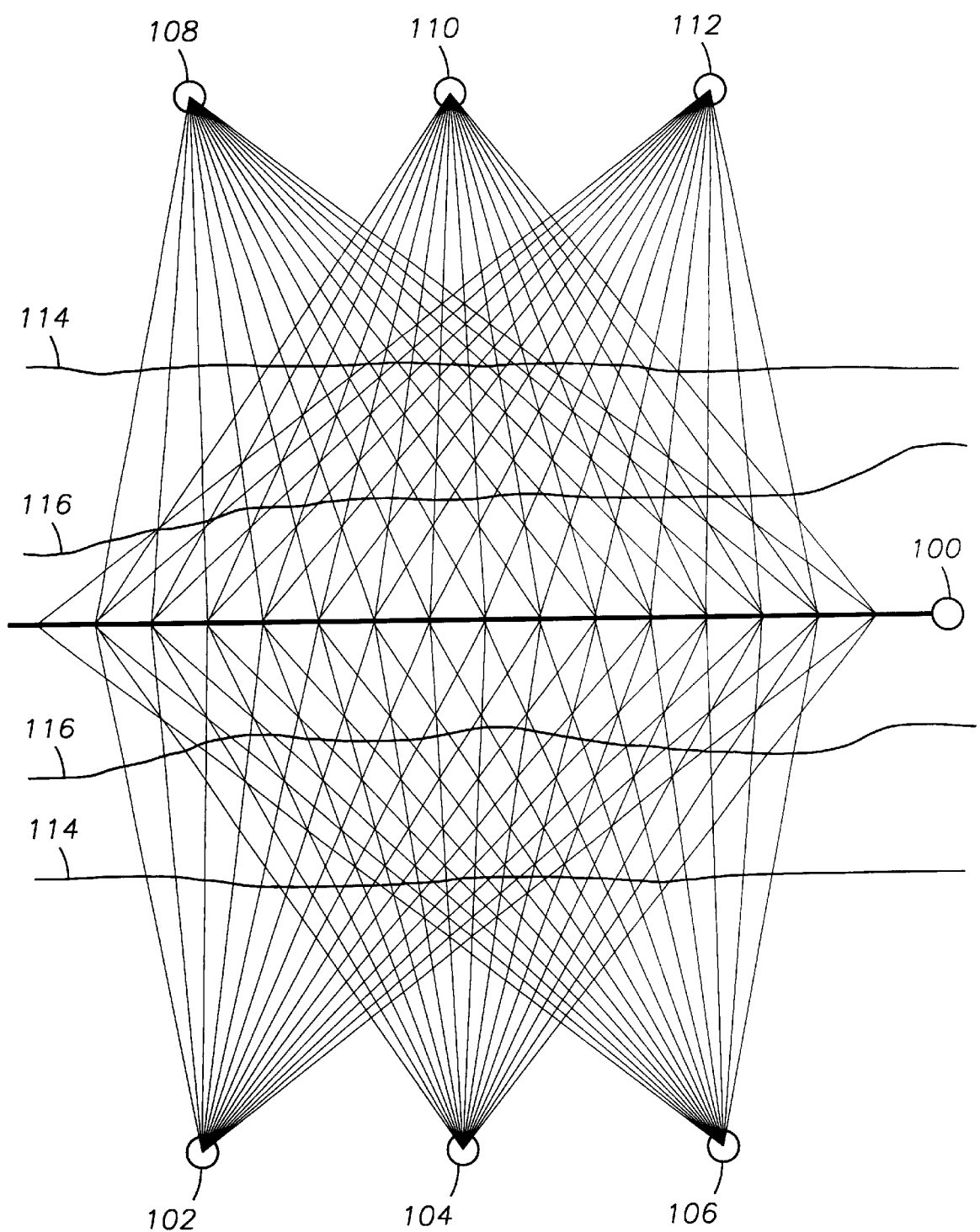
FIG. 7 is a plan view of FIG. 6 showing the exemplary lateral fanout of the wavefield radiation trajectory patterns from the injector wells and a water-front boundary determined therefrom.

Refer now to FIG. 7, a plan view of FIG. 6 (like numbers being used in both Figures). A horizontal producing well, 100, is provided with an array of spaced-apart seismic acoustic receivers at least along the horizontal portion of the borehole. The injector wells, 102–112, three on each side of an oil reservoir boundaries 114, are each provided with one or more seismic acoustic sources of any desired type. The sources in the respective injector wells are triggered sequentially. The resulting wavefield radiation fans out, in turn, from each of the injector wells to be received by the respective seismic receivers installed in the horizontal production well 100.

Let it be assumed that the selected petrophysical parameter is acoustic slowness, 1/V, where V is the velocity of propagation of an acoustic pulse in the rock mass making up the reservoir. As is well known, the fluid content of the rocks (oil or water or gas) may influence the slowness. Thus, measurements of acoustic slowness along the respective trajectories between each of the injector wells, 102–112, and the respective receivers in the production borehole 100 could provide an indication of the advance of the water-flood front terminators 116.

In processing the data, the region between the injector wells 102–112 and the production well 100, is divided into pixels or bins. The bin dimensions are defined on the basis of the desired resolution of the water flood boundary. It is evident that a sparsely-binned datum such as might be calculated from a single trajectory would yield an indeterminate estimate of the presence of the actual water flood boundary, But a composite of the binned data measurements from a large number of intersecting trajectories, such as shown in the central portion of FIG. 7, would, after normalization, provide good definition of the water flood advance.

Computer-aided data-processing methods of any well known type may be used which are suitable to the field conditions, to the type of radiation energy employed and to the instrumentation to be installed. Known geostatistical methods such as Kalman filtering and kriging may be appropriate. Although it is contemplated that existing wells preferably be used, in problem regions specially-drilled boreholes may be needed.

This invention has been described with a certain degree of specificity by way of example but not by way of limitation. Those skilled in the art will devise obvious variations to the examples given herein but which will fall within the scope and spirit of this invention which is limited only by the appended claims.

The invention claimed is:

1. In combination with a process of mineral production management of a subsurface region embracing a deposit during the life span of the deposit, the deposit having a mineral content, a method for cyclically monitoring time-varying changes of a selected petrophysical parameter having a regional texture attributable to volumetric re-distribution of the content of said deposit due to production of the mineral content thereof from a plurality of boreholes, comprising:

a) installing in each of said plurality of boreholes a source of radiation and at least one sensor for measuring a geophysical analogue of said selected petrophysical parameter;

b) in combination with the process of said mineral production management during a monitoring cycle, causing said source to radiate a wavefield having predefined characteristics to illuminate the subsurface region embracing the deposit, said wavefield being a chirp signal characterized by a predefined length and spectral content;

c) using said sensor, making a single-ray imaging measurement of said geophysical analogue of the selected petrophysical parameter taken in the light of the wavefield radiation illuminating the subsurface region along a wavefield trajectory between said source and said sensor, the spectral content of the imaged signal being a measure of a characteristic of the selected geophysical parameter;

d) illuminating said subsurface region from different azimuths by repeating steps b) and c) for every possible source-and-sensor combination from said plurality of boreholes to provide a plurality of single-ray imaging measurements between the respective sources and sensors; and e) combining the single-ray imaging measurements to form a snap-shot image representative of the regional texture of the selected petrophysical parameter.

2. The method as defined by claim 1, wherein:
at least some of said plurality of boreholes penetrate said mineral deposit.

3. The method as defined by claim 1 wherein:
at least some of said wavefield trajectories transit said mineral deposit.

4. The method of claim 1, wherein:
said wavefield is characterized by acoustic radiation.

5. The method as defined by claim 1, wherein:
said wavefield is characterized by electromagnetic radiation.

6. The method as defined by claim 4, wherein:
the selected geophysical parameter that is imaged is the acoustic slowness of an acoustic wavefield.

7. The method as defined by claim 4, wherein:
said selected geophysical parameter that is imaged is attenuation of an acoustic wavefield.

8. The method as defined by claim 1, wherein:
said wavefield is a gravity wavefield.

9. The method as defined by claim 1, wherein:
said wavefield is a neutron wavefield.

10. A method for cyclically monitoring time-varying changes of a selected petrophysical parameter attributable to volumetric re-distribution of the contents of a mineral deposit embraced by a subsurface region penetrated by a plurality of spaced-apart boreholes, comprising:

a) permanently installing in each said borehole, at least one acoustic transmitter and at least one acoustic receiver and at least one electromagnetic transmitter and at least one electromagnetic receiver;

b) during the course of a periodic monitoring cycle, causing at least one of said transmitters from the respective ones of said plurality of boreholes sequentially to illuminate said subsurface region;

c) causing each said receiver to receive a plurality of single-ray imaging measurements of a geophysical analogue of said selected petrophysical parameter, as revealed by the illumination process of step b), over every combination of source-receiver trajectories; and d) combining said plurality of single-ray imaging measurements to display the pattern of said petrophysical parameter existing at the end of the current monitoring cycle.

11. The method as defined by claim 10, comprising:

Permanently installing in each said borehole, an array of a plurality of spaced-apart acoustic wavefield receivers.

12. The method as defined by claim 10, wherein:

said radiation receivers include a plurality of wavefield receiving means of different genera.

13. The method as defined by claim 11, wherein:

the transmitted wavefield is an acoustic Dirac function the image of which, as seen by a receiver after transmission through said mineral deposit, has a caudal portion that is characterized by a relaxation time having a duration that is associated with changes in the contents of the mineral deposit.

* * * * *